US012608842B2

(12) United States Patent
Shibata et al.

(10) Patent No.: US 12,608,842 B2
(45) Date of Patent: Apr. 21, 2026

(54) INFORMATION PROCESSING DEVICE, INFORMATION PROCESSING METHOD, COMPUTER PROGRAM PRODUCT, AND WELDING SYSTEM

(71) Applicants: KABUSHIKI KAISHA TOSHIBA, Tokyo (JP); TOSHIBA ENERGY SYSTEMS & SOLUTIONS CORPORATION, Kawasaki-shi (JP)

(72) Inventors: Tomoyuki Shibata, Kawasaki (JP); Shinsaku Amano, Yokohama (JP)

(73) Assignees: KABUSHIKI KAISHA TOSHIBA, Tokyo (JP); TOSHIBA ENERGY SYSTEMS & SOLUTIONS CORPORATION, Kawasaki (JP)

( * ) Notice: Subject to any disclaimer, the term of this patent is extended or adjusted under 35 U.S.C. 154(b) by 252 days.

(21) Appl. No.: 18/354,971

(22) Filed: Jul. 19, 2023

(65) Prior Publication Data

US 2024/0242379 A1 Jul. 18, 2024

(30) Foreign Application Priority Data

Jan. 18, 2023 (JP) ................................. 2023-005896

(51) Int. Cl.
*G06T 7/73* (2017.01)
*B23K 9/095* (2006.01)

(52) U.S. Cl.
CPC .............. *G06T 7/74* (2017.01); *B23K 9/0956* (2013.01); *G06T 2207/20081* (2013.01); *G06T 2207/30108* (2013.01)

(58) Field of Classification Search
CPC ............. G06T 7/74; G06T 2207/20081; G06T 2207/30108; B23K 9/0956
See application file for complete search history.

(56) References Cited

U.S. PATENT DOCUMENTS 5,572,102 A * 11/1996 Goodfellow ........... B25J 9/1697
                                                                          700/192
2020/0357112 A1 11/2020 Sakai et al.
                        (Continued)

FOREIGN PATENT DOCUMENTS

JP        10-2020-0094608 A    8/2020
JP            2020-182966 A   11/2020
                        (Continued)

OTHER PUBLICATIONS

Zhang et al., "Distribution-Aware Coordinate Representation for Human Pose Estimation" University of Electronic Science and Technology of China. 2019, 9 pages.
                        (Continued)

*Primary Examiner* — Christopher S Kelley
(74) *Attorney, Agent, or Firm* — Oblon, McClelland, Maier & Neustadt, L.L.P.

(57) ABSTRACT

An information processing device includes one or more hardware processors. The hardware processors generate at least one piece of second supervised data by using at least one piece of first supervised data. The first supervised data includes at least one welding image capturing a welding target, and true values of positions of a plurality of keypoints within the welding image. The second supervised data includes a transformed image obtained by transforming the welding image so as to change relative positions of the keypoints, and true values of changed positions. The hardware processors learn a detection model by using the first supervised data and the second supervised data. The detection model receives input of the welding image and outputs the positions of the keypoints.

8 Claims, 8 Drawing Sheets

(56) References Cited

U.S. PATENT DOCUMENTS

2023/0201973 A1\*   6/2023  Jørgensen  .............. B23K 31/02
                                                     219/124.4
2023/0222930 A1      7/2023  Shiomi et al.
2023/0390927 A1\*  12/2023  Christy  ................. B25J 11/005

FOREIGN PATENT DOCUMENTS

JP       2021-079444  A     5/2021
JP       2023-102023  A     7/2023

OTHER PUBLICATIONS

Japanese Office Action dated Mar. 3, 2026, issued in Japanese
Patent Application No. 2023-005896 (with English translation;
Documents 19 and 20 being cited therein).

\* cited by examiner

FIG.4

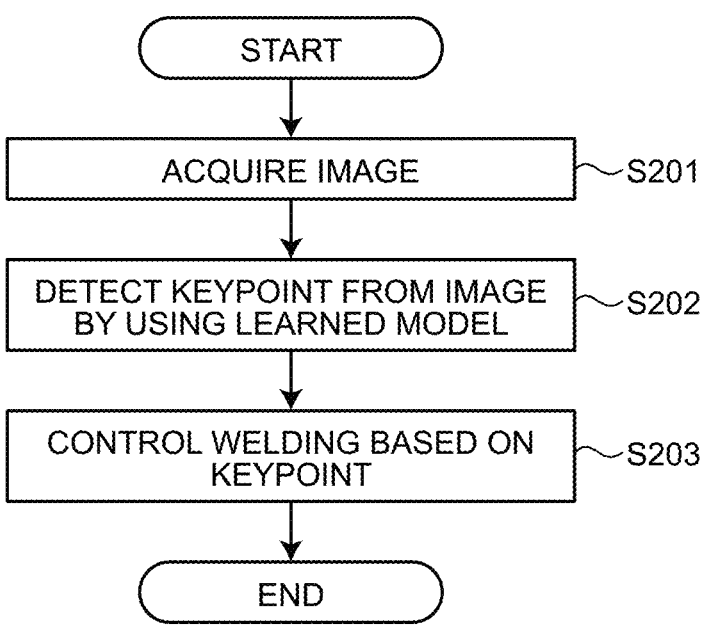

```
        ┌─────────────┐
        │    START    │
        └──────┬──────┘
               ↓
   ┌───────────────────────┐
   │    ACQUIRE IMAGE      │───S201
   └───────────┬───────────┘
               ↓
   ┌───────────────────────┐
   │ DETECT KEYPOINT FROM  │───S202
   │ IMAGE BY USING        │
   │ LEARNED MODEL         │
   └───────────┬───────────┘
               ↓
   ┌───────────────────────┐
   │ CONTROL WELDING BASED │───S203
   │ ON KEYPOINT           │
   └───────────┬───────────┘
               ↓
        ┌─────────────┐
        │     END     │
        └─────────────┘
```

FIG.5

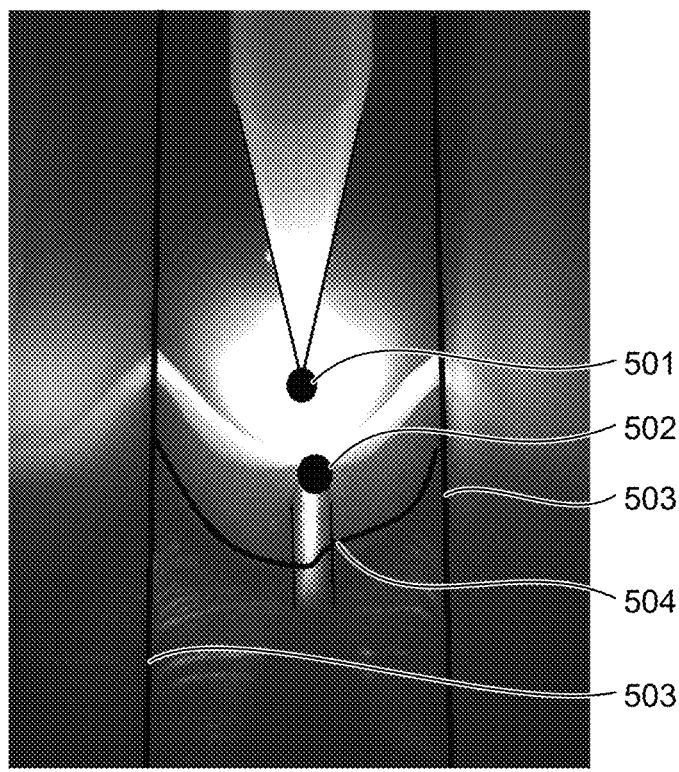

1101

| 51 | 52 | 53 |
| --- | --- | --- |
| CPU | ROM | RAM |

61

54

COMMUNICATION
I/F

INFORMATION PROCESSING DEVICE, INFORMATION PROCESSING METHOD, COMPUTER PROGRAM PRODUCT, AND WELDING SYSTEM

CROSS-REFERENCE TO RELATED APPLICATIONS

This application is based upon and claims the benefit of priority from Japanese Patent Application No. 2023-005896, filed on Jan. 18, 2023; the entire contents of which are incorporated herein by reference.

FIELD

An embodiment described herein generally relates to an information processing device, an information processing method, a computer program product, and a welding system.

BACKGROUND

There is a known technique that detects keypoints from a captured image of a welding target (welding image) and controls welding using positions of the detected keypoints. When detecting keypoints from an image, for example, a detection model is used that is learned (trained) using supervised data that includes a learning image and true values of the positions of the keypoints in the image (correct answer data).

As a learning method of reducing the load for acquiring supervised data, for example, there may be a method that uses images acquired during operation of a welding system as supervised data.

However, the above learning method may not be able to provide a detection model that improves the accuracy of detecting keypoints in situations (irregular situations) different from those during normal operation, for example.

BRIEF DESCRIPTION OF THE DRAWINGS

FIG. 4 is a flowchart illustrating welding control processing;

FIG. 5 is a diagram for describing examples of keypoints;

DETAILED DESCRIPTION

An information processing device according to an embodiment includes one or more hardware processors. The hardware processors generate at least one piece of second supervised data by using at least one piece of first supervised data including at least one welding image capturing a welding target, and true values of positions of a plurality of keypoints within the welding image. The second supervised data includes a transformed image obtained by transforming the welding image so as to change relative positions of the keypoints, and true values of changed positions. The hardware processors learn a detection model by using the first supervised data and the second supervised data. The detection model receives input of the welding image and outputs the positions of the keypoints. With reference to the accompanying drawings, a preferable embodiment of an information processing device according to an embodiment will be described in detail hereinafter.

One of the expectations for keypoint detection processing is a guide of welding areas to correct the welding areas to the correct positions. Therefore, irregular situations that require control to correct to the correct positions are the cases that require high detection accuracy.

However, with the above-described method that uses images captured during operation of the welding system as supervised data, it may not be possible to improve the robustness of keypoint detection in irregular situations that differ from the normal operation.

On the other hand, for example, if images captured by intentionally causing irregular situations are used, it is possible to acquire supervised data assuming irregular situations, but the processing load increases. Therefore, from the perspective of processing load, it is desirable to learn a detection model (keypoint detector) based on images captured during the operation of the welding system.

Therefore, in the present embodiment, images (a group of image) that can be used as supervised data are generated from a group of images acquired during a normal operation by image transformation that reproduces irregular situations, and a detection model is trained using supervised data that also includes the generated images. Whereby, a more accurate detection model can be acquired to be used for controlling welding. For example, it is possible to acquire a detection model that achieves robust keypoint detection that enables more accurate detection even in irregular situations.

Figure 1:
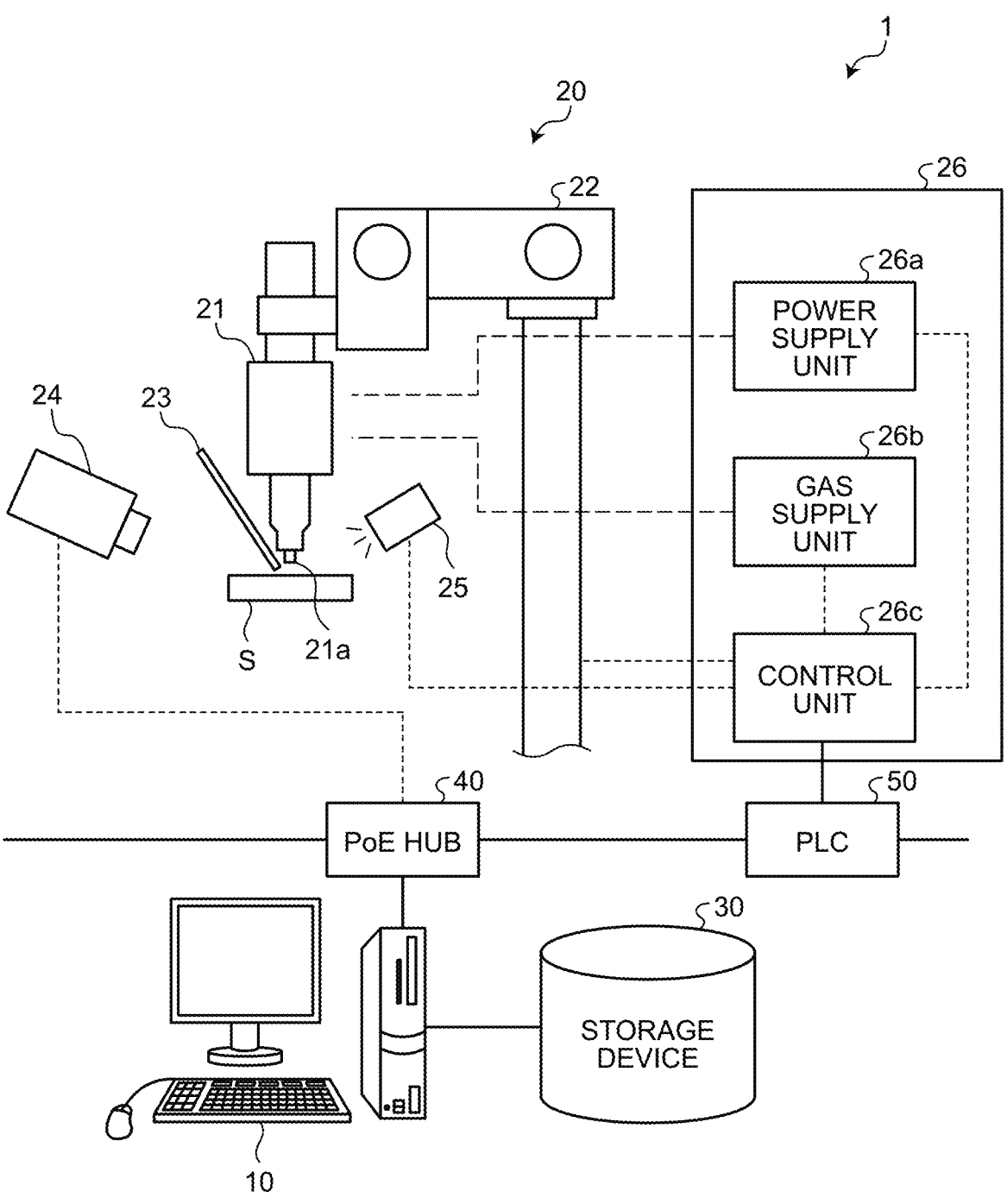
FIG. 1 is a schematic diagram of a welding system that includes an information processing device according to an embodiment.

FIG. 1 is a schematic diagram illustrating a configuration of a welding system that includes the information processing device of the embodiment. A welding system 1 includes an information processing device 10, a welding device 20, a storage device 30, a PoE (Power over Ethernet (registered trademark)) hub 40, and a PLC (Programmable Logic Controller) 50. Note that the storage device 30 may be an external device connected to the information processing device 10 or may be built into the information processing device 10, and it is not limited to the present embodiment.

The welding device 20 welds and unifies two or more members. The welding device 20 executes, for example, arc welding or laser welding. Specifically, arc welding is Tungsten Inert Gas (TIG) welding, Metal Inert Gas (MIG) welding, Metal Active Gas (MAG) welding, carbon dioxide gas arc welding, or the like. Herein, an example where the welding device 20 executes TIG welding will mainly be described.

The welding device 20 includes, for example, a head 21, an arm 22, a wire 23, an imaging unit 24, a lighting unit 25, and a welding control unit 26. The welding control unit 26 includes a power supply unit 26a, a gas supply unit 26b, and a control unit 26c.

In the head 21, a tungsten electrode 21a is provided. The tip of the electrode 21a is exposed from the head 21. For example, the head 21 is attached to an articulated arm 22 that includes a plurality of links. Alternatively, the head 21 may be provided on a welding torch that is grasped by an operator.

The power supply unit 26a is electrically connected to the electrode 21a and a welding target S. A voltage is applied between the electrode 21a and the welding target S by the power supply unit 26a, and arc discharge is generated. One of the electrode 21a and the welding target S may be set to a common potential (for example, ground potential), and the power supply unit 26a may control only the other potential of the electrodes 21a and the welding target S.

The gas supply unit 26b is connected to the head 21. The gas supply unit 26b supplies an inert gas to the head 21. Alternatively, the gas supply unit 26b may supply a mixture of an inert gas and an active gas. The gas supplied to the head 21 is blown toward the welding target S from the tip of the head 21 where the electrode 21a is exposed.

The tip of the wire 23 is placed in a space where the arc discharge is generated. The tip of the wire 23 is melted by the arc discharge, and drips onto the welding target S. As the molten wire 23 solidifies, the welding target S is welded. The wire 23, for example, is fixed to the arm 22, and automatically fed as the melting progresses.

During welding, the imaging unit 24 captures an image of the area where welding is being executed. The imaging unit 24 captures an image of the welding area to acquire a still image. Alternatively, the imaging unit 24 may capture a video. The imaging unit 24 cuts out part of the video to acquire a still image. The imaging unit 24 is a camera including a CCD image sensor or a CMOS image sensor, for example.

The lighting unit 25 illuminates the welding area during welding such that a clearer image can be acquired by the imaging unit 24. The lighting unit 25 may not need to be provided, if images that can be used for processing of latter stages can be acquired without illuminating the welding area.

The control unit 26c controls the operations of each of the above-described structural components of the welding device 20. For example, the control unit 26c generates arc discharge while driving the arm 22, and welds the welding target S along a prescribed direction. The control unit 26c may also control the setting of the imaging unit 24, the setting of the lighting unit 25, and the like.

The PoE hub 40 is a hub that connects the imaging unit 24, the information processing device 10, and the PLC 50. The PLC 50 is connected to the welding control unit 26 (or control unit 26c) of the welding device 20.

Images captured by the imaging unit 24 are transmitted to the information processing device 10 via the PoE hub 40, for example, and stored in the storage device 30 connected to the information processing device 10. For example, the captured images are stored in the storage device 30 in association with the welding condition at the time of capture and the imaging condition at the time of capture.

The welding condition includes, for example, applied voltage, gas flow rate, current value, wire feed rate, or welding speed. The imaging condition includes, for example, the setting of the imaging unit 24 such as exposure time, aperture, or sensitivity (ISO). The imaging condition may also include the setting of the lighting unit 25. For example, when a pulse current is supplied to the lighting unit 25, the imaging condition further includes pulse width, pulse frequency, duty ratio, or peak value. Note that when a plurality of items are listed herein in a connected manner by "or", it means that all of those items may be included or only some of those items may be included.

Figure 2:
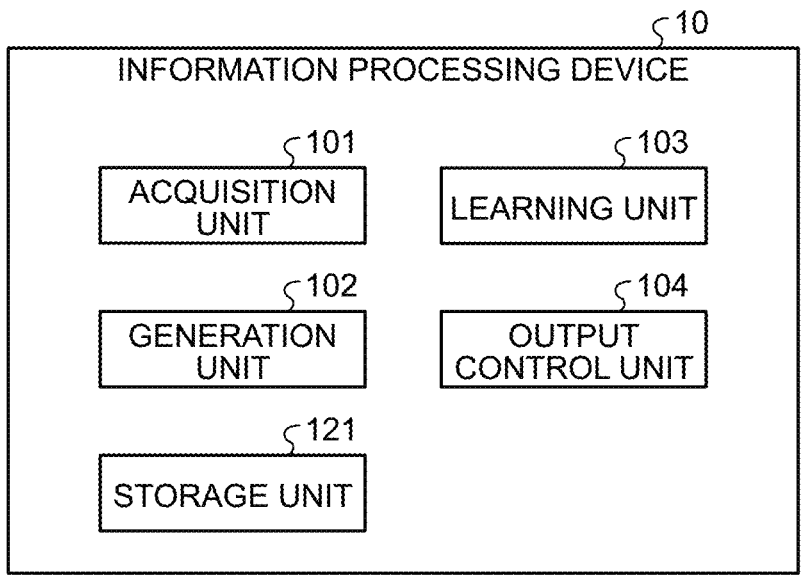
FIG. 2 is a block diagram of the information processing device.

FIG. 2 is a block diagram illustrating an example of the configuration of the information processing device 10. As illustrated in FIG. 2, the information processing device 10 includes an acquisition unit 101, a generation unit 102, a learning unit 103, an output control unit 104, and a storage unit 121.

The acquisition unit 101 acquires various kinds of information used in the information processing device 10. For example, the acquisition unit 101 acquires at least one welding image (may either be still image or moving image) of a welding target captured by the imaging unit 24 of the welding device 20. The acquisition unit 101 also acquires designation of the correct answer data representing the true values of the positions of a plurality of keypoints within the welding images.

The correct answer data is used together with the welding image for machine learning of a detection model that detects the positions of specific keypoints in the image, which is one of the image recognition techniques (image recognition task). In other words, at least one piece of supervised data including a welding image and the true values of the positions of the keypoints in the welding image are used for learning the detection model.

Thus, for example, a user designates the positions of keypoints in the image for the number of keypoints to be the target of detection. While any methods may be used as a method for designating the positions of keypoints, it is possible to apply, for example, a method of inputting coordinate values directly on an image, a method of designating positions in an image by a mouse or the like using a graphical user interface provided separately for designation, or the like. The acquisition unit 101 acquires the correct answer data representing the positions of the keypoints designated in this manner.

The acquisition unit 101 can acquire (generate) supervised data that includes the image acquired from the welding device 20 and the designated correct answer data (true values of the positions of the keypoints). When the supervised data is created by an external device other than the welding system 1, for example, the acquisition unit 101 may acquire the supervised data from the external device. In that case, the acquisition unit 101 does not need to acquire the welding image from the welding device 20, nor does it need to acquire designation of the correct answer data.

The generation unit 102 uses supervised data TA (first supervised data) acquired by the acquisition unit 101, and generates new supervised data TB (second supervised data) that includes a transformed image obtained by transforming the welding image included in the supervised data TA. For example, the generation unit 102 generates at least one piece of supervised data TB including a transformed image obtained by transforming the welding image so as to change relative positions of the keypoints, and the true values of the changed positions.

The learning unit 103 learns a detection model using the supervised data TA and the supervised data TB. A detection model is a model for detecting positions of specific keypoints in an input image, which is one of the image recognition techniques. The detection model may be of any structure and, for example, it may be a model using Dark-Pose that is one of the methods using a convolutional neural network. Furthermore, the learning method by the learning unit 103 may be any methods that can be applied to the detection model to be employed.

The output control unit 104 controls output of various kinds of information used in the information processing device 10. For example, the output control unit 104 outputs information (parameters and the like) regarding the trained detection model to the welding device 20. This allows the welding device 20 to use the trained detection model to control welding. For example, the control unit 26c inputs the image (welding image) captured by the imaging unit 24 to the detection model, and controls welding using the positions of the keypoints output by the detection model.

Each of the above units (the acquisition unit 101, the generation unit 102, the learning unit 103, and the output control unit 104) is achieved by a single or a plurality of processors, for example. For example, each of the above units may be achieved by having a processor such as a central processing unit (CPU) execute a program, that is, by software. Each of the above units may be achieved by a processor such as dedicated integrated circuit (IC), that is, hardware. Each of the above units may be achieved by using a combination of software and hardware. When using a plurality of processors, each of the processors may achieve one of the units or may achieve two or more of the units.

The storage unit 121 stores therein various kinds of information used in various kinds of processing performed by the information processing device 10. For example, the storage unit 121 stores the images acquired by the acquisition unit 101 and designation of the correct answer data. The information processing device 10 may also be configured to use the storage device 30 instead of the storage unit 121.

Note that the storage unit 121 and the storage device 30 may be configured with any commonly used storage media such as a flash memory, a memory card, a Random Access Memory (RAM), a Hard Disk Drive (HDD), and an optical disc.

Figure 3:
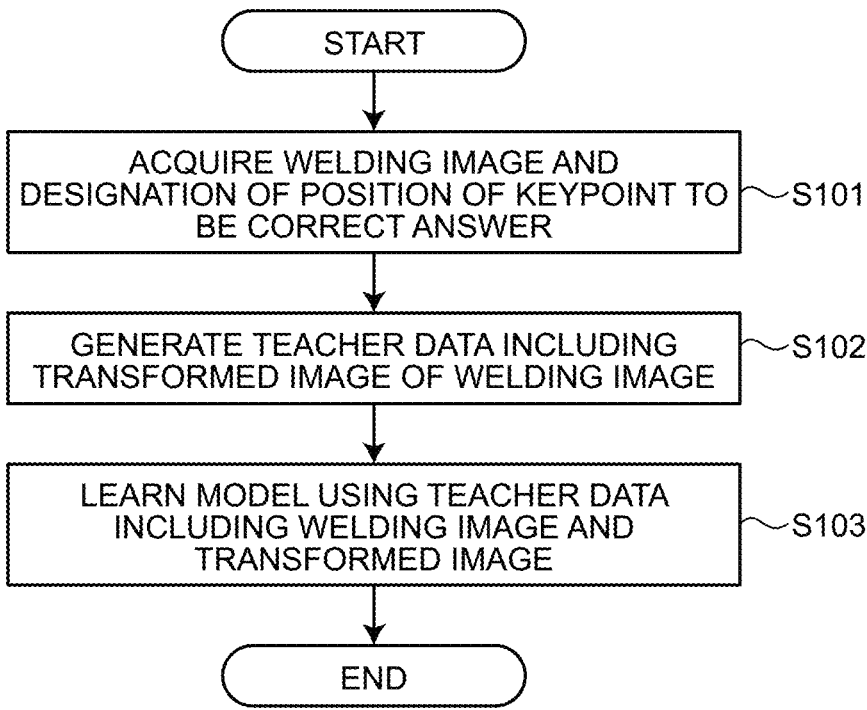
FIG. 3 is a flowchart illustrating learning processing.

Next, learning processing of a detection model performed by the information processing device 10 will be described. FIG. 3 is a flowchart illustrating an example of the learning processing according to the present embodiment.

The acquisition unit 101 acquires at least one welding image from the welding device 20, and also acquires the positions of the keypoints to be the correct answers designated by the user or the like (Step S101). This allows the acquisition unit 101 to acquire (generate) at least one piece of supervised data TA that includes the welding image and the correct answer data representing the designated positions.

The generation unit 102 generates a transformed image obtained by transforming the acquired welding image, and generates at least one piece of supervised data TB that includes the transformed image and the true values of the positions of the changed keypoints (Step S102).

The learning unit 103 learns a detection model using the supervised data TA and the supervised data TB (Step S103), and ends the learning processing.

Next, welding control processing using the detection model by the welding device 20 will be described. FIG. 4 is a flowchart illustrating an example of the welding control processing according to the present embodiment.

The imaging unit 24 acquires images of the welding areas, for example, in chronological order (Step S201). The control unit 26c detects a plurality of keypoints from the image for each of the acquired images using, for example, the trained detection model (Step S202). The control unit 26c controls welding performed by the welding device 20 to weld the optimal position based on the detected keypoints (Step S203).

Any methods may be used for the welding control method based on keypoints. For example, an example of cases using keypoints corresponding to following objects will be described.

(OBJ1) Tip of the electrode 21a ("electrode tip" hereinafter)

(OBJ2) Tip of the wire 23 ("wire tip" hereinafter)

(OBJ3) Groove wall face (OBJ4) Molten pool contour

In that case, for example, the control unit 26c drives the arm 22 by feedback control such that the electrode tip and the wire tip are positioned at the center of the groove wall face. The control unit 26c also controls the speed for moving the electrode tip and the wire tip in the direction along the groove wall face such that the molten pool contour comes in contact with the groove wall face.

Figure 6:
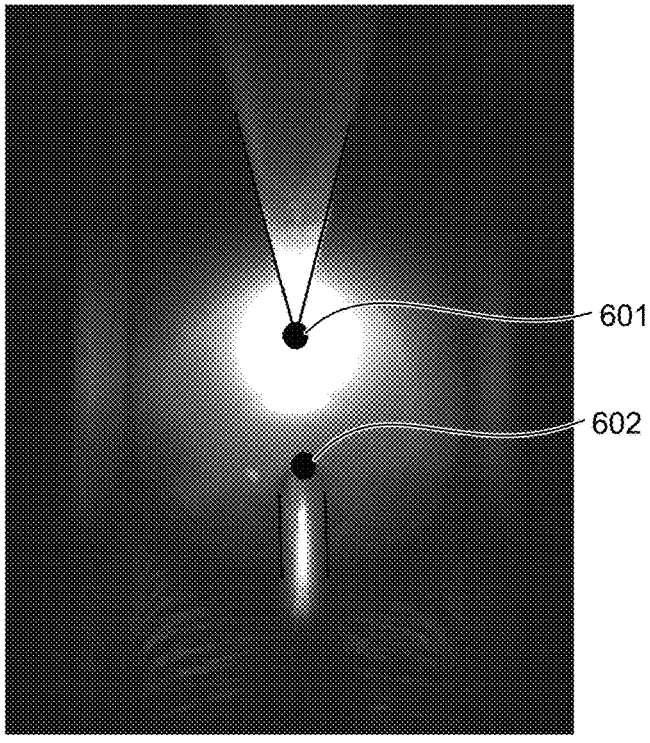
FIG. 6 is a diagram for describing examples of keypoints.
Figure 7:
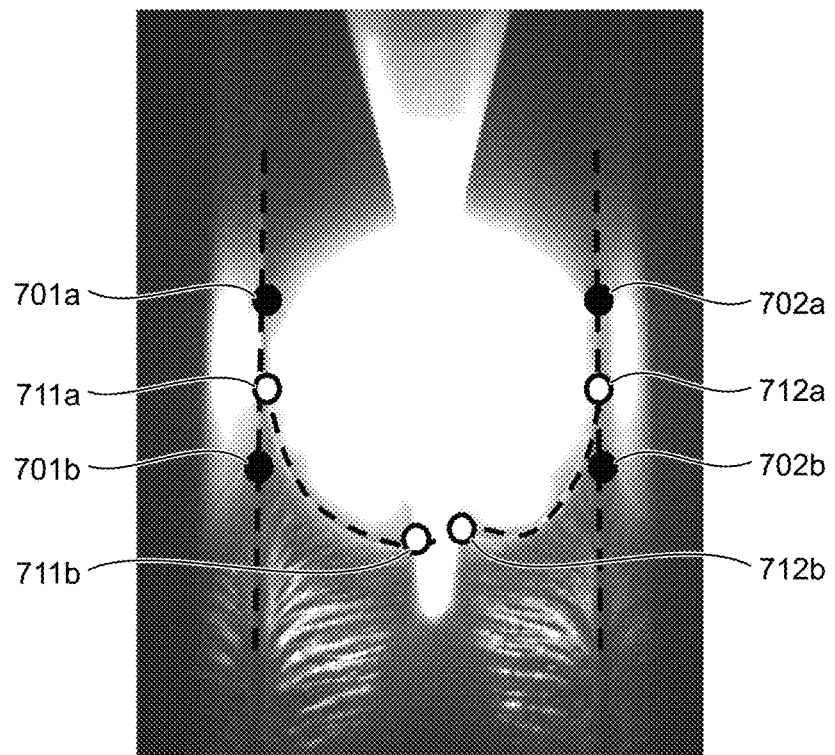
FIG. 7 is a diagram for describing examples of keypoints.

Hereinafter, details of the processing performed by each of the above units will be described further. First, examples of keypoints used in the welding system 1 will be described. FIG. 5 to FIG. 7 are diagrams for describing examples of the keypoints.

FIG. 5 illustrates an example of a welding image where objects 501, 502, 503, and 504 corresponding to the above four objects (OBJ1) to (OBJ4) are superimposed on each other. FIG. 6 illustrates an example of a welding image in which keypoints 601 and 602 corresponding to the object 501 (electrode tip) and the object 502 (wire tip) among those objects are detected. FIG. 7 illustrates an example of a welding image in which keypoints 701a, 701b, 702a, 702b corresponding to the object 503 (groove wall face) and keypoints 711a, 711b, 712a, 712b corresponding to the object 504 (molten pool contour) among those objects are detected.

As described, the object as a target for detecting keypoints may be represented by a single keypoint or by a plurality of keypoints. For example, as illustrated in FIG. 6, the electrode tip and the wire tip are each represented by a single keypoint. Furthermore, as illustrated in FIG. 7, two groove wall faces (left and right groove wall faces) are each represented by two keypoints, and the molten pool contour is represented by four keypoints.

Since strong light is emitted during welding, two welding images as illustrated in FIG. 6 and FIG. 7 can be acquired by capturing images in two modes with different exposure time, for example. An image maybe captured with one type of exposure time, and all keypoints may be detected from a single welding image.

Figure 8:
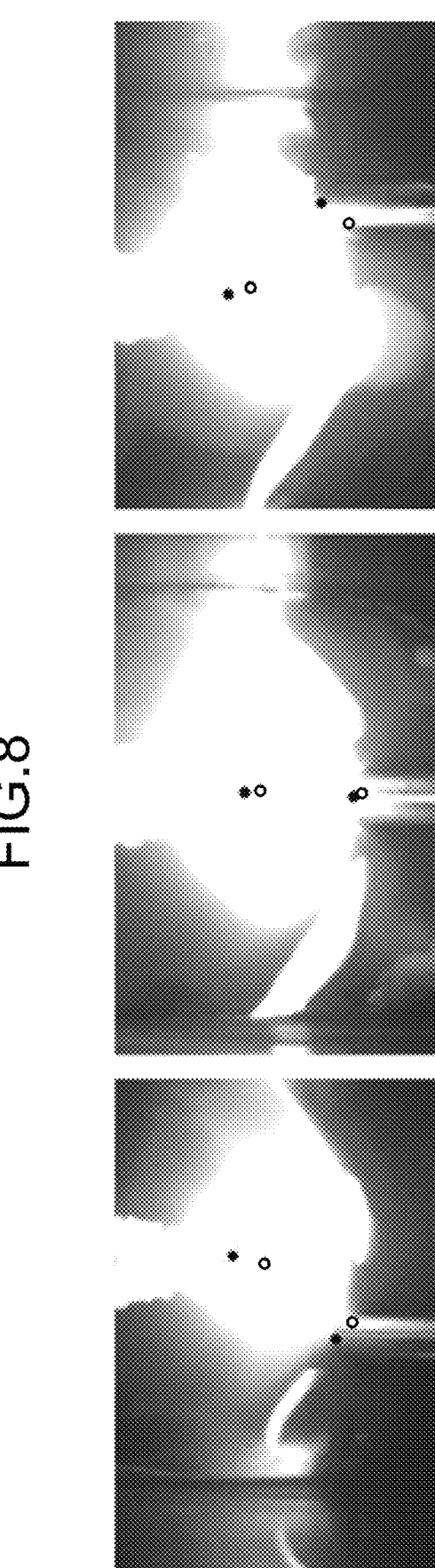
FIG. 8 is a diagram illustrating examples of images having detection errors.

When a transformed image is not generated by the generation unit 102, that is, when a detection model trained using only a welding image as supervised data is used, the detection accuracy of keypoints may be deteriorated. FIG. 8 is a diagram illustrating examples of three images having detection errors. In FIG. 8, black circles represent the true values of the positions of the keypoints (correct answer data), and white circles represent the positions of the keypoints predicted by the detection model.

In order to minimize detection errors as in FIG. 8, in the present embodiment, the generation unit 102 generates a transformed image in which image transformed is applied to a welding image and uses it as the supervised data. In other words, the generation unit 102 uses the supervised data TA acquired by the acquisition unit 101, and generates the new supervised data TB that includes a transformed image obtained by transforming a welding image. By transforming the welding image in the manner described above, a pseudo-irregular situation can be reproduced. However, it is not necessary to reproduce the appearance of the image for humans, for example, but simply an irregular situation for the detection model may be reproduced.

For example, the welding device 20 performs welding by melting a base material (the wire 23) with the heat of the arc discharge generated from the electrode 21*a*. Thus, the welding device 20 (the control unit 26*c*) controls, for example, the position of the electrode 21*a* and the position of the wire 23. The positional relation between the metal to be joined, the electrode 21*a*, and the wire 23 is acquired from the image and controlled to the optimum positions, which may slightly vary depending on the welding method. Thus, for example, a situation where the position of the electrode 21*a* and the position of the wire 23 are far apart is considered an irregular situation.

An example of a method for reproducing such irregular situations, that is, an example of a method for generating a transformed image by the generation unit 102, will be described below.

Generation Method 1

The generation unit 102 divides a welding image into two partial images by a line passing through the midpoint of a plurality of keypoints, and generates a transformed image in which the two partial images are relatively moved to be shifted in the direction of the line. For example, the generation unit 102 divides the welding image into upper and lower images centered at the midpoint between the keypoint corresponding to the electrode 21*a* (keypoint 601 in FIG. 6) and the keypoint corresponding to the wire 23 (keypoint 602 in FIG. 6), and randomly translates each of the upper image and lower image to the left and right.

Whereby, a welding image in which the positions of the electrode 21*a* and the wire 23 are aligned in a horizontal direction (in lateral direction of the image) can be transformed into a transformed image of an irregular situation where those are separated to the left and right. As described, image transformation is the transformation of the target keypoints as the target from the positions in the original welding image to the assumed moved positions.

Figure 9:
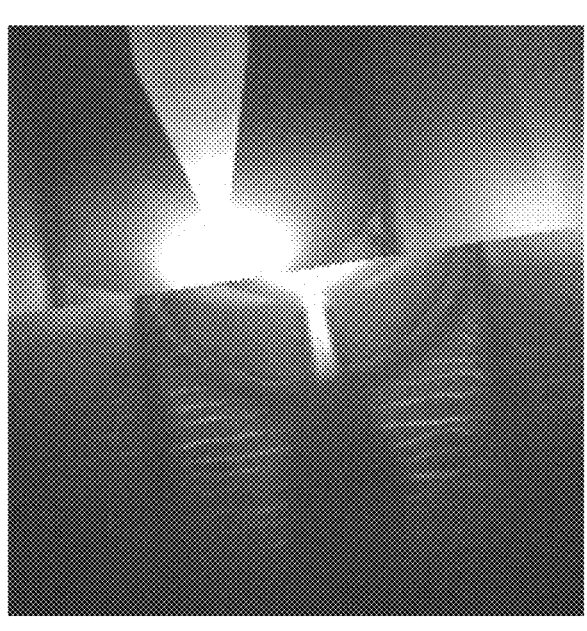
FIG. 9 is a diagram illustrating an example of a transformed image to be generated.

FIG. 9 is a diagram illustrating an example of a transformed image generated by the generation method 1. FIG. 9 illustrates an example of a transformed image in which the partial images are translated and then rotated. As described, the generation unit 102 may perform image transformation including rotation.

When the positions of two keypoints are not aligned in the lateral direction (or longitudinal direction) of the image, for example, the welding image may be divided into two partial images using a line orthogonal to the line segment connecting a plurality of keypoints as a line passing through the midpoint of the keypoints.

Due to the move, the transformed image may come to have an area that is not included in the original welding image. For such an area, for example, an average value of the pixel values of the entire image or a fixed pixel value may be set. When the welding image before transformation is an image cut out from a larger image, the generation unit 102 may acquire information of the corresponding area from the image before cutting out and set it in the transformed image.

Combinations of the keypoints whose relative positions are to be changed are designated in advance, for example. Among a plurality of combinations defined in advance, the generation unit 102 may select the combination to change the relative position according to a rule defined in advance. The rule is, for example, a rule to select randomly.

Relative positions may be changed among a plurality of groups each containing at least one keypoint. In other words, the generation unit 102 may generate the supervised data TB that includes a transformed image in which relative positions among the groups are changed.

The method of changing the relative positions (changing method) may also be designated in advance, or a method selected among a plurality of designations according to a rule may be applied. The changing method includes, for example, some or all selected from frequency, moving range (moving amount), and moving direction. The frequency represents the ratio of image transformation that is performed in the learning processing repeated for a plurality of times, for example.

The moving range is, for example, a range of moving amount of the position to be moved. The generation unit 102 may determine the moving amount of the position from the moving range to follow a rule defined in advance. The rule in this case is, for example, a rule that determines to follow Gaussian distribution. The moving range (moving amount) may be determined to be within a range of degrees of freedom that can be controlled by the welding device 20.

Generation Method 2

Image transformation using the generation method 1 is discontinuous in appearance to humans. The generation unit 102 may use image transformation that is continuous transformation. For example, the generation unit 102 considers the target including a plurality of keypoints as a non-rigid body and generates a transformed image by nonlinearly transforming the welding image such that the relative positions of the keypoints are changed in accordance with deformation of the non-rigid body. A nonlinear transformation is, for example, a transformation using the B-spline method.

Generation Method 3

The generation unit 102 may generate a transformed image by using an image generator (a convolutional neural network model, a generative AI model such as a diffusion model, or the like) that receives input of an image before being changed and positions of keypoints after being changed, and outputs a transformed image.

Generation Method 4

The generation unit 102 may generate a transformed image with an area added between a plurality of keypoints. For example, there may be a case where welding is performed in a plurality of times because welding of a single time may not fill metal sufficiently. In such a case, at the point where the first welding is done, for example, a situation may arise where the distance between one of the groove wall faces on both sides and the molten pool contour becomes greater than the distance between the other groove wall face and the molten pool contour.

Figure 10:
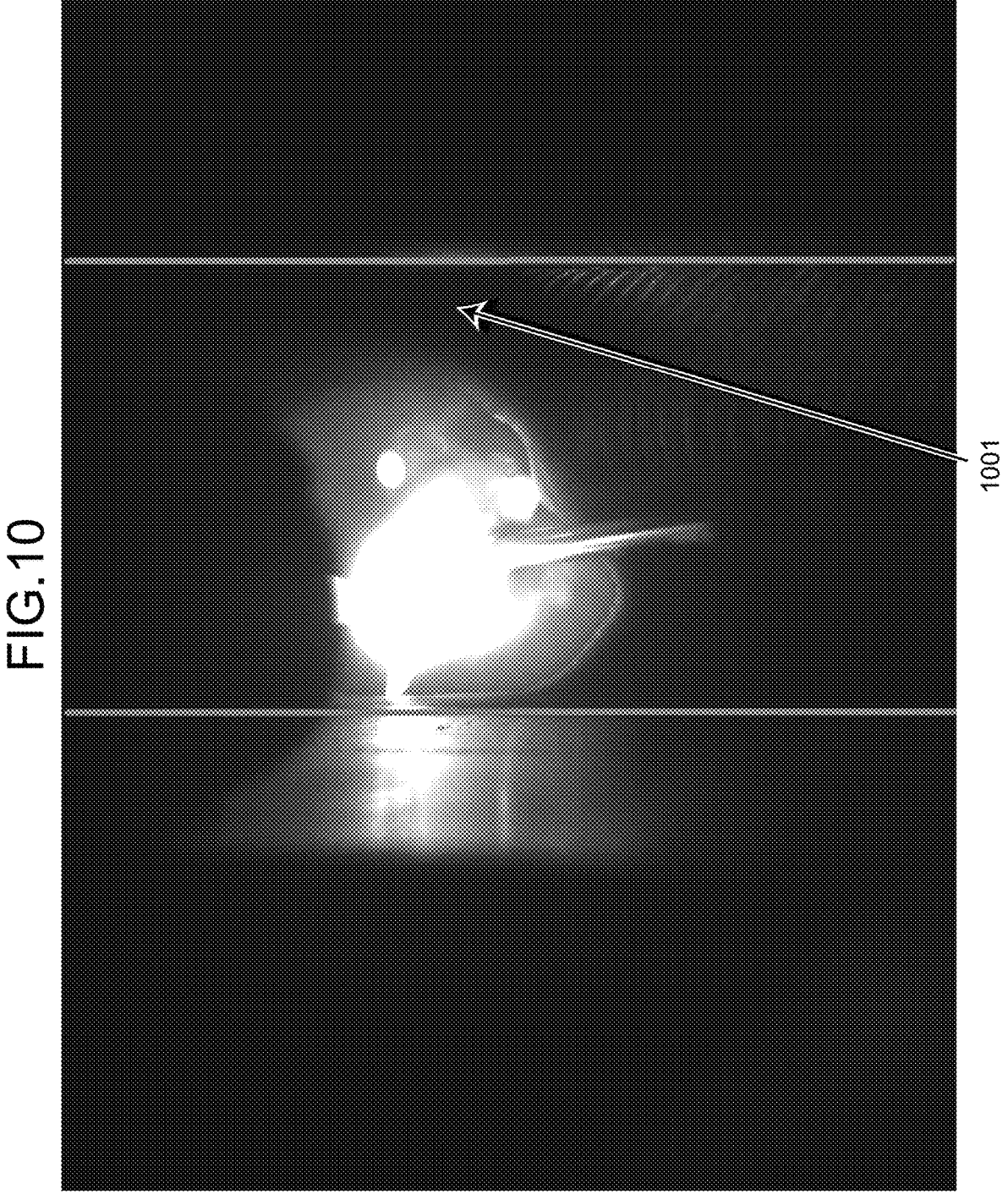
FIG. 10 is a diagram illustrating an example of a welding image.

FIG. 10 is a diagram illustrating an example of a welding image indicating such a situation. In the example in FIG. 10, two gray lines correspond to the groove wall faces. To the left of the right-side groove wall face, there is an area 1001 where metal is not filled, since welding is not performed yet.

When a detection model that is not trained using the supervised data including such a welding image, keypoints corresponding to the groove wall faces may not be detected accurately. Therefore, in the generation method 4, the transformed image is generated to be in a same situation as the welding image. For example, the generation unit 102 generates a transformed image with an area added between the two keypoints corresponding to the two groove wall faces, respectively.

Figures 11, 12:
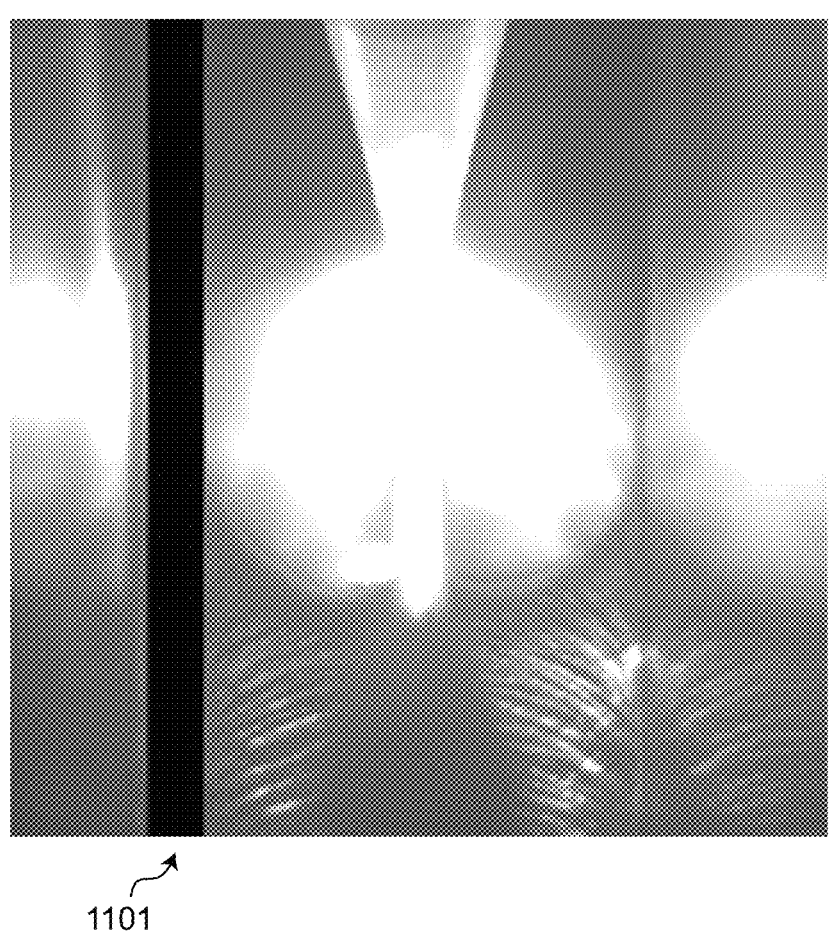
FIG. 11 is a diagram illustrating an example of a transformed image to which an area is added.
FIG. 12 is a hardware configuration diagram of the information processing device.

FIG. 11 is a diagram illustrating an example of a transformed image in which such an area 1101 is added. The pixel value of the area to be added may be a fixed value or may be a value calculated from the pixel values of the image, such as the average value of the pixel values of the entire image.

Generation Method 5

The generation unit 102 may also generate a transformed image according to a plurality of keypoints designated by the user or the like and a designated position changing method. These designations are acquired, for example, by the acquisition unit 101 and output to the generation unit 102.

While any methods may be used for designating keypoints and changing method, it is possible to apply a method in which the user makes designation on a screen displayed on a display device or the like, for example. For example, the user designates a specific keypoint such as the electrode tip on the screen using an input device such as a mouse, and further designates the moving direction and the moving amount. For an object represented by two points such as the groove wall face, the user designates the two points as a group, and further designates the moving direction and moving amount of the group.

As described, the information processing device according to the present embodiment generates supervised data in which various situations are reproduced by image transformation from data acquired under a limited condition (normal operation or the like), and uses the generated supervised data to learn a detection model. Whereby, a more accurate detection model can be acquired. For example, it becomes possible to more accurately detect positions of the keypoints even for situations other than those for which data is acquired.

Next, the hardware configuration of the information processing device according to the present embodiment will be described by referring to FIG. 12. FIG. 12 is a diagram illustrating an example of the hardware configuration of the information processing device according to the present embodiment.

The information processing device according to the present embodiment includes a control device such as a CPU 51, memory devices such as a Read Only Memory (ROM) 52 and a RAM 53, a communication I/F 54 that is connected to a network for performing communication, and a bus 61 that connects each of the units.

The computer program to be executed by the information processing device according to the present embodiment is provided by being loaded in advance in the ROM 52 or the like.

The computer program to be executed by the information processing device according to the present embodiment may be recorded in an installable or executable format file on a computer readable recording medium such as a Compact Disk Read Only Memory (CD-ROM), a flexible disk (FD), a Compact Disk Recordable (CD-R), a Digital Versatile Disk (DVD), or the like, and may be provided as a computer program product.

Furthermore, the computer program to be executed by the information processing device according to the present embodiment may be stored on a computer connected to a network such as the Internet and may be provided by being downloaded via the network. The computer program executed by the information processing device according to the present embodiment may be provided or distributed via a network such as the Internet.

The computer program executed by the information processing device according to the present embodiment may cause the computer to function as each of the units of the information processing device described above. As for the computer, the CPU 51 can read the computer program from a computer-readable storage medium and execute it on the main memory.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing device comprising:
   one or more hardware processors configured to:
      generate at least one piece of second supervised data by using at least one piece of first supervised data including at least one welding image capturing a welding target, and true values of positions of a plurality of keypoints within the welding image, the second supervised data including a transformed image obtained by transforming the welding image so as to change relative positions of the keypoints, and true values of changed positions; and
      learn a detection model by using the first supervised data and the second supervised data, the detection model receiving input of the welding image and outputting the positions of the keypoints, wherein
      the transformed image is an image in which the welding image is divided into two partial images by a line passing through a midpoint of the keypoints, and the two partial images are relatively moved to be shifted in a direction of the line.

2. The information processing device according to claim 1, wherein the hardware processor generate the second supervised data that includes the transformed image in which relative positions of a plurality of groups each including at least one keypoint are changed.

3. The information processing device according to claim 1, wherein the transformed image is an image in which an area is added between the keypoints.

4. The information processing device according to claim 1, wherein the transformed image is an image obtained by nonlinearly transforming the welding image such that the relative positions of the keypoints are changed in accordance with deformation of a target that is assumed as a non-rigid body including the keypoints.

5. The information processing device according to claim 1, wherein the one or more hardware processors are configured to acquire designation of the keypoints for which the relative positions are to be changed, and designation of a changing method of the positions, and
   change the relative positions of designated keypoints according to a designated changing method.

6. An information processing method executed by an information processing device comprising one or more hardware processors, the information processing method comprising:
   generating at least one piece of second supervised data by using at least one piece of first supervised data including at least one welding image capturing a welding target, and true values of positions of a plurality of keypoints within the welding image, the second supervised data including a transformed image obtained by transforming the welding image so as to change relative positions of the keypoints, and true values of changed positions; and learning a detection model by using the first supervised data and the second supervised data, the detection model receiving input of the welding image and outputting the positions of the keypoints, wherein the transformed image is an image in which the welding image is divided into two partial images by a line passing through a midpoint of the keypoints, and the two partial images are relatively moved to be shifted in a direction of the line.

7. A computer program product having a non-transitory computer readable medium including programmed instructions, wherein the instructions, when executed by a computer, cause the computer to perform:

generating at least one piece of second supervised data by using at least one piece of first supervised data including at least one welding image capturing a welding target, and true values of positions of a plurality of keypoints within the welding image, the second supervised data including a transformed image obtained by transforming the welding image so as to change relative positions of the keypoints, and true values of changed positions; and learning a detection model by using the first supervised data and the second supervised data, the detection model receiving input of the welding image and outputting the positions of the keypoints, wherein the transformed image is an image in which the welding image is divided into two partial images by a line passing through a midpoint of the keypoints, and the two partial images are relatively moved to be shifted in a direction of the line.

8. A welding system comprising:

an information processing device; and a welding device, wherein the information processing device comprises:

one or more hardware processors configured to:

generate at least one piece of second supervised data by using at least one piece of first supervised data including at least one welding image capturing a welding target, and true values of positions of a plurality of keypoints within the welding image, the second supervised data including a transformed image obtained by transforming the welding image so as to change relative positions of the keypoints, and true values of changed positions; and learn a detection model by using the first supervised data and the second supervised data, the detection model receiving input of the welding image and outputting the positions of the keypoints, and the welding device comprises:

an imaging device that captures the welding image; and a controller that controls welding by using the positions of the keypoints output by a trained detection model, wherein the transformed image is an image in which the welding image is divided into two partial images by a line passing through a midpoint of the keypoints, and the two partial images are relatively moved to be shifted in a direction of the line.

* * * * *